United States Patent [19]

Haack et al.

[11] 4,144,316
[45] Mar. 13, 1979

[54] PRODUCTION OF CHLORINE AND IRON OXIDE FROM FERRIC CHLORIDE

[75] Inventors: David J. Haack; James W. Reeves, both of Wilmington, Del.

[73] Assignee: E. I. Du Pont de Nemours and Company, Wilmington, Del.

[21] Appl. No.: 899,695

[22] Filed: Apr. 24, 1978

[51] Int. Cl.$^2$ .............................................. C01B 7/03
[52] U.S. Cl. .................... 423/502; 423/533
[58] Field of Search .................. 423/500, 502, 533

[56] References Cited

U.S. PATENT DOCUMENTS

| | | | |
|---|---|---|---|
| 2,642,339 | 6/1953 | Sawyer | 423/502 |
| 3,092,456 | 6/1963 | Nelson et al. | 423/502 |
| 3,376,112 | 4/1968 | Dunn, Jr. et al. | 423/502 |
| 3,793,444 | 2/1974 | Reeves et al. | 423/502 X |

OTHER PUBLICATIONS

Alfred Weiss, Ed., "World Mining & Metals Technology," The Society of Mining Engineers, N.Y., Aug. 1976, pp. 693-712.

Primary Examiner—Earl C. Thomas

[57] ABSTRACT

An improved process is provided for producing chlorine and iron oxide in a fluidized-bed reactor by treating ferric chloride in the vapor phase with an excess of oxygen at a temperature of 550° to 800° C. in the presence of a catalyst made from sodium chloride and iron oxide. A carbonaceous fuel is fed to the reactor bed to supply supplemental heat. The improvement comprises using a fluidized-bed reactor in which a portion of the bed material is continuously recycled and the carbonaceous fuel is supplied in a pulverized solid form in an amount equal to between 1 and 9 percent of the weight of the iron chloride fed. The fuel has a stable ignition temperature in air of no higher than 500° C. and contains hydrogen amounting to between 0.5 and 2.5 percent by weight of the fuel. The process is particularly useful for avoiding potential pollution problems associated with the disposal of iron chloride by-product from ilmenite chlorination processes while recovering valuable chlorine.

4 Claims, 1 Drawing Figure

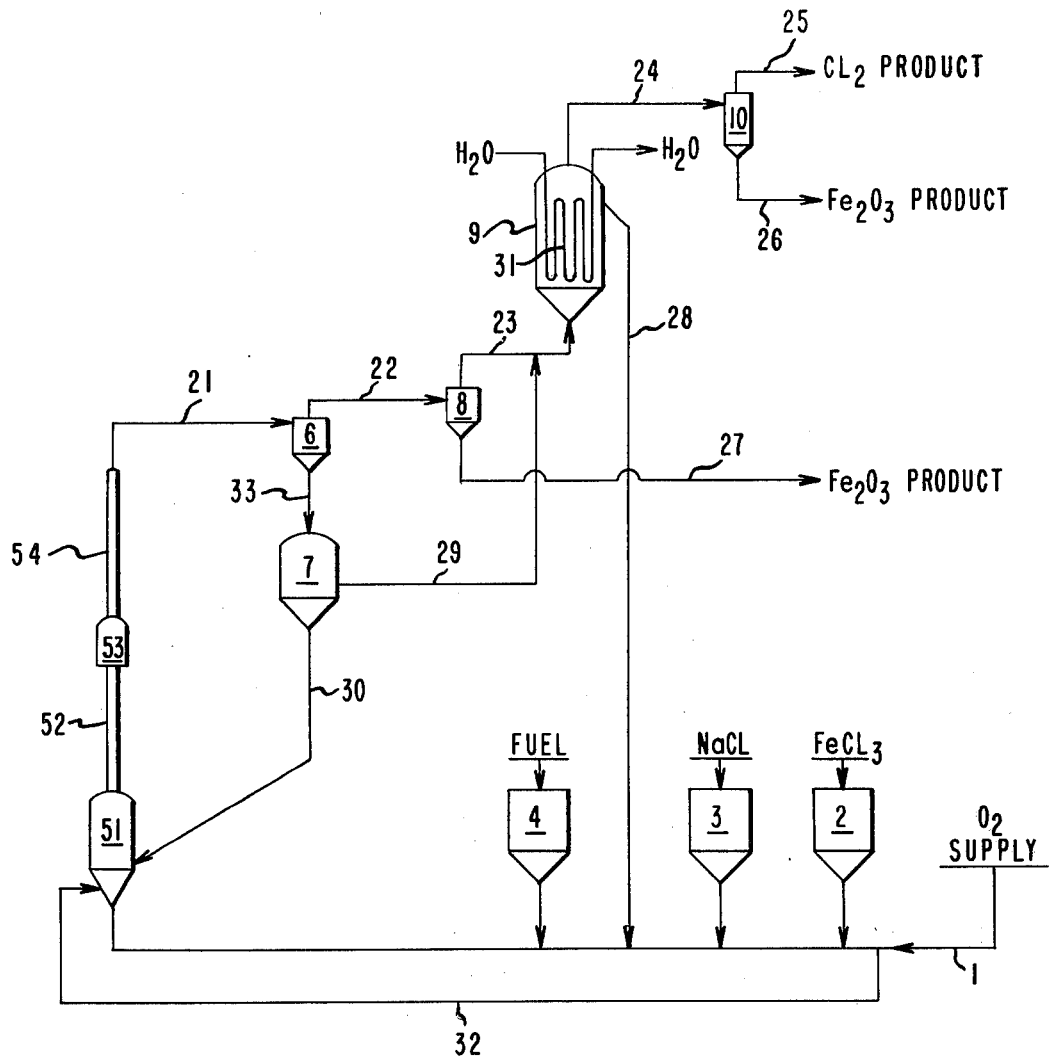

PRODUCTION OF CHLORINE AND IRON OXIDE FROM FERRIC CHLORIDE

BACKGROUND OF THE INVENTION

1. Field of the Invention

This invention concerns an improved process for producing chlorine and iron oxide from iron chlorides. More particularly, it concerns such a process wherein the ferric chloride is treated in the vapor phase with oxygen in a fluidized-bed reactor.

2. Prior Art

Several industrial processes, such as the direct chlorination of ilmenite ores to produce titania, generate large quantities of by-product iron chlorides. Disposal of these iron chlorides poses potential pollution problems and represents an economic loss for the chlorine content of the by-products.

Harris, et al, "Process for Chlorination of Titanium Bearing Materials and for Dechlorination of Iron Chloride", in *World Mining and Metals Technology*, Alfred Weiss, Ed., The Society of Mining Engineers, New York, Chapter 44, pages 693-712 (August 1976), suggest that ferric chloride can be treated with oxygen in a fluidized-bed reactor in the vapor phase. The process produces chlorine gas, which can be recycled to an ilmenite chlorination process, and iron oxide by-product rather than soluble chloride wastes. According to Harris et al, the process, which was investigated on laboratory size equipment at temperatures of 500° to 550° C., includes: feeding preheated oxygen into the bottom of the reactor countercurrent to product iron oxide which exits to collection from the bottom of the reactor; feeding solid ferric chloride particles to the reactor; optionally feeding small amounts of carbon to furnish heat to the system; and treating in a separated stream a portion of the iron oxide collected with sodium chloride which may then be recycled to the reactor as a catalyst in an amount equal to about 25 percent by weight of the ferric chloride feed. Although this process is reported to operate satisfactorily on the laboratory scale, the authors point out that an industrial process for waste conversion of ferric chloride by dechlorination is still needed.

Others, such as Sawyer, U.S. Pat. No. 2,642,339, describe similar ferric chloride treatments in the vapor phase with oxygen in fluidized-bed reactors, but these processes do not suggest the use of supplementary fuel in the reactor. Dunn et al, U.S. Pat. No. 3,376,112, disclose carrying out the dechlorination reaction in a moving bed reactor wherein carbon-containing fuel materials, such as carbon tetrachloride, carbon monoxide, phosgene or hydrocarbons, optionally may be used. In still another process for treating iron chloride in the vapor phase with oxygen, Nelson et al, U.S. Pat. No. 3,092,456, disclose the use of a once-through, vapor-phase combustion chamber, wherein iron oxide incrustations on the walls of apparatus downstream of the combustion chamber can be prevented by deactivating the oxygen in the reaction product stream by introducing into the product stream, at a point downstream of the reaction zone, a material such as hydrogen, ammonia, methane, producer gas, benzene, diethyl ether, acetone, carbon monoxide, or finely ground metallurgical coke.

Although each of the above described processes has shown some promise for industrial application, it has been found that for highest conversion of iron chloride to chlorine and iron oxide on an industrial scale, a recirculating-fluidized-bed reactor, for example of the type suggested by Reeves et al, U.S. Pat. No. 3,793,444, is preferred. Reeves et al suggest that it is generally unnecessary, at least in a commercial size operation, to supply heat directly to the system once a steady state is achieved. However, it has now been found that in industrial scale equipment of this type, control of temperature, especially during variations in ferric chloride feed rates, is most difficult and can often lead to uncontrolled temperature excursions.

To overcome the problems associated with uncontrolled temperature excursions in recirculating-fluidized-bed reactors, the present invention provides for the addition of particulate solid carbonaceous fuels. It was surprising that only certain specific fuels were satisfactory in overcoming these temperature problems associated with ferric chloride dechlorination reactions in industrial size recirculating-fluidized-bed reactors.

SUMMARY OF THE INVENTION

The present invention provides an improved process for producing chlorine and iron oxide in a fluidized-bed reactor by treating ferric chloride in the vapor phase with an excess of oxygen at a temperature of 550° to 800° C. in the presence of a catalyst made from sodium chloride and iron oxide, wherein a carbonaceous fuel is fed to the reactor bed to supply supplemental heat. The improvement comprises continuously recirculating a portion of the bed material through the reactor and supplying the fuel as a dry, pulverized solid in an amount equal to between 1 to 9 percent of the weight of the iron chloride fed to the reactor. The fuel has a stable ignition temperature in air of no higher than 500° C. and contains hydrogen amounting to between 0.5 and 2.5 percent based on the weight of the fuel.

Preferred conditions include: feeding to the reactor between 103 and 170% of the stoichiometric amount of oxygen required to convert all the iron chloride to iron oxide and all carbon and hydrogen in the fuel to carbon dioxide and water, respectively; providing a recirculation of material through the reactor in an amount that equals 1 to 10, most preferably 2 to 6, times the weight rate of iron chloride feed; and supplying a quantity of fuel that is between 3 and 7 percent of the weight of the iron chloride fed, the fuel having a stable ignition temperature of between 350° and 450° C., and a hydrogen content of between 0.6 and 1.5 weight percent.

DESCRPTION OF THE DRAWING

The attached drawing is a schematic diagram of a continuous process which embodies the present invention and can be carried out on an industrial scale.

DETAILED DESCRIPTION OF THE INVENTION

Operation of an industrial process for the vapor phase reaction of ferric chloride with oxygen to form gaseous chlorine and solid iron oxide in a recirculating-fluidized-bed reactor generally requires a long bed which has a diameter of between 2 and 10 feet (0.6 and 3 meters). However, the achievement of stable uniform temperatures across such a reactor bed is very difficult. External heaters are usually inadequate. Internal heaters complicate the reactor design, are difficult to maintain in the corrosive atmosphere of the reactor and generally do not provide satisfactory response to feed variations or upsets.

A possible solution to the temperature stability problem would be to mix carbonaceous fuels with the reactants and burn the fuel uniformly throughout the reactor. However, when a solid carbonaceous fuel, such as the metallurgical coke suggested in the art, is used, the temperature stability problem is still not overcome. For example, when metallurgical coke, which has a hydrogen content of less than 0.1 weight percent and a stable ignition temperature in air of approximately 650° C., is mixed with the reactants in a recirculating-fluidized-bed reactor, combustion of the carbon is incomplete in a single passage through the reactor. With a recirculating fluidized bed, the incomplete combustion results in a high inventory of carbon in the reactor, which is detrimental to temperature stability. For example, when a decrease occurs in the feed rate of iron chloride or an increase occurs in the oxygen feed rate, such as may be experienced due to normal variations or small upsets in the system, the rate of burning of the carbon in the reactor increases and results in an uncontrolled increase in temperature in the reactor bed. Conversely, a variation that results in an increase in the iron chloride feed rate or a decrease in the oxygen feed rate, results in a decrease in the rate of carbon burning and an uncontrolled decrease in temperature. Such uncontrolled temperature excursions adversely affect yield and productivity and can even shut down the reaction.

It has now been found surprisingly that by careful selection of the solid carbonaceous material, the above-described problems of temperature instability can be avoided and the carbon can be caused to burn substantially completely in a single pass through the reactor system. The particular solid carbonaceous fuel of the present invention has a hydrogen content of between 0.5 and 2.5 percent based on the total weight of the fuel and has a stable ignition temperature of no higher than 500° C. For optimum operation, the fuel has a hydrogen content of between 0.6 and 1.5 weight percent and a stable ignition temperature in air of between 350° and 450° C.

When the hydrogen content of the solid carbonaceous fuel is less than about 0.5 weight percent, the problems associated with the use of metallurgical coke, as described above, are encountered. When the hydrogen content is greater than about 2.5 weight percent, excessive amounts of water are generated by reaction of the hydrogen with oxygen. The water is rapidly adsorbed by unreacted ferric chloride, which is highly hydroscopic, and forms a sticky hydrate of low melting temperature which can foul and plug the system. Excessive amounts of hydrogen in the fuel can also result in loss of chlorine product due to reaction of the hydrogen with the chlorine to form hydrogen chloride, which is highly corrosive.

In addition to the hydrogen content of the fuel being limited in the present invention to between 0.5 and 2.5 weight percent, preferably between 0.6 and 1.5 weight percent, it is also necessary for the fuel to have a stable ignition temperature in air of no higher than 500° C., preferably between 350° and 450° C. Such a stable ignition temperature in air has been found to assure that the fuel will burn substantially completely and uniformly in one pass through the reactor. Only very small quantities of carbon, if any, are recirculated when the fuel is within the above-described hydrogen-content and ignition-temperature limits of the invention. Thus, the temperature instabilities associated with large recirculation rates of carbon, such as occur with the use of metallurgical coke, are avoided.

The solid carbonaceous fuels suitable for use in the present invention can range quite widely in average particle size. For example, particles averaging in size from less than ¼ inch (6.35 mm) to greater than 50 microns have generally been found useful. Average particle sizes of 150-350 micron are preferred. These particles sizes are based on the weight averages as determined by conventional sieving techniques, such as those described in ASTM-D-310-34.

The weight of pulverized carbonaceous fuel fed to the recirculating-fluidized-bed reactor generally amounts to between 1 and 9 percent of the weight of the iron chloride feed. The amount of fuel fed depends on the heat losses from the system and the temperature at which the vapor-phase reaction of ferric chloride and oxygen is being carried out. High reaction temperatures and high heat losses require fuel feed rates that are in the high range of the fuel-to-iron-chloride weight ratio. Similarly, lower reaction temperatures and lower heat losses require fuel feed rates that are in the lower end of the range of the fuel-to-iron-chloride ratio.

The solid carbonaceous fuels suitable for use in the present invention can be prepared conveniently in conventional coking equipment from "low-rank" fuels, such as lignite or some sub-bituminous coals. These low-rank fuels are subjected to carbonization at high temperatures, usually between 700° and 900° C. The carbonization treatment is continued until the hydrogen content of the fuel is reduced tp the desired range. The fuel may then be ground to the desired size. If necessary, the ground fuel is dried so that it can be fed substantially free of water to the recirculating-fluidized-bed reactor.

The method for determining the stable ignition temperature of the fuel in air is as follows. A 10-milligram sample of the pulverized fuel is placed in the sample holder of a thermo-gravimetric analyzer, such as a Du Pont Model 951 Thermogravimetric Analyzer. The sample is spread within the holder so that a one-particle-thick layer of the fuel is obtained with minimal grain-to-grain contact. With air flowing over the sample at a rate of 40 milliliters per minute, the sample is heated to provide a 10° C. per minute rise in temperature of the sample. The temperature of the sample is monitored with a sensitive thermocouple. When the fuel sample reaches a temperature of 150° C., its weight is recorded. Then, the heating is continued and the temperature at which a 10% decrease is reached is the measured value of the "stable ignition temperature in air".

The hydrogen content of the fuels (which also includes hydrogen from moisture) is determined by the method for ultimate analysis for hydrogen, according to ASTM Standards, Part 19, March 1967, Section D-271, "Sampling and Analysis of Coal and Coke."

In the practice of the present invention, the iron chloride feed material may be obtained from any of many different sources. Clearly, the feed can be chemically pure ferric chloride, but more importantly from an industrial viewpoint, the feed can be obtained in a mixture of by-products from an industrial plant, such as the by-product stream from an ilmenite chlorination process for manufacturing titania. A typical composition of such a by-product stream is as follows:

| Component | % by weight |
|---|---|
| $FeCl_3$ | 87 |
| $FeCl_2$ | 5 |
| $TiCl_4$ | 3 |
| $AlCl_3$ | 2 |
| $MnCl_2$ | 2 |
| $MgCl_2$ | 0.6 |
| Miscellaneous | 0.4 |

A feed material of approximately this composition was used in the Examples and Comparisons given below.

In operation of the process of the present invention, the ferric chloride is vaporized and treated with an excess of oxygen to form gaseous chlorine and solid iron oxide. The chlorine product can be recycled directly to the ilmenite chlorination process or recovered for other uses. Under the conditions of the present process, ferrous chloride in the iron chloride feed is converted to ferric chloride and then to ferric oxide product. The treatment of the ferric chloride with oxygen is carried out in the presence of fluidized particles of iron oxide that have been treated with sodium chloride to form a catalyst for the conversion of ferric chloride to ferric oxide. As noted above, pulverized carbonaceous fuel having the hydrogen content and ignition temperature characteristics required by the invention, is also fed to the reacting system in order to maintain stable reaction temperatures and to provide supplemental heat. The amount of oxygen fed is in excess of the stoichiometric amount required to convert all the iron chlorides in the feed to ferric oxide and all the carbon and hydrogen in the fuel to carbon dioxide and water, respectively. Preferably, the oxygen feed amounts to between 103 and 170% of the stoichiometric amount. In the reactor, the recirculation rate of the iron oxide particles of the fluidized bed can be varied over a wide range. Generally, the bed material is recirculated at a weight rate of flow equal to between 1 and 10 times the iron chloride feed rate. Preferred recirculation rates are between 2 and 6 times the weight rate or iron chloride feed.

Suitable equipment for carrying out the present invention as a continuous process is depicted in the schematic diagram attached to the application.

As shown in the diagram, oxygen is fed to line 1. The oxygen, which is not heated, is supplied at a pressure of about 100 psig (6.8 atm). The size of line 1 is such that the oxygen feed is maintained at a sufficiently high velocity to permit transport of iron chloride, sodium chloride, pulverized fuel and recycle material fed to line 1 from pressurized storage vessels 2, 3 and 4 which are pressurized with a gas, for example $N_2$, and recycle line 28, respectively. The materials in the storage vessels are maintained dry. The oxygen and any gas which may exit from the pressurized storage vessels and the solid materials conveyed with the gas through line 1 enter the reactor, which comprises the equipment designated by numerals 51, 52, 53 and 54, through the bottom of reactor vessel 51.

As noted above, the reactor is divided into several sections. The first section, reactor vessel 51, into which the materials from line 1 enter, is ceramic-lined to an internal diameter of 2½ feet (76 cm) and has a height of 9.3 feet (2.85 m), including a height of 2 feet (0.61 m) for the conical bottom and 1.25 feet (0.38 m) for the hemispherical head. Four supplemental oxygen inlets, supplied through line 32, are located at about the mid-height of the bottom conical portion of reactor vessel 51. The nozzles are spaced 90 degrees apart and inject oxygen radially into the center of the cone. Approximately 5 to 15% of the total oxygen fed to the reactor vessel is supplied through these nozzles. The fluidized bed particles, reactants and products formed flow concurrently from reactor vessel 51 through ceramic-lined pipe 52, which measures 9 inches (22.9 cm) in inside diameter and about 6 feet (1.83 m) in length, into enlarged, ceramic-lined section 53, which measures about 2 feet (61 cm) in inside diameter and 4 feet (1.22 m) in length. In pipe 52, because of the higher velocity of the stream, the solids concentration is lower than in reactor vessel 52. The enlarged section 53 serves to reduce the velocity of the particles and acts as a mixer prior to the entry of the stream into ceramic-lined pipe 54, which is of the same diameter as pipe 52 and measures 28 feet (8.54 m) in length.

Within reactor vessel 51, the materials fed from line 1 are heated to temperatures in the range of 550° to 800° C.; ferric chloride is vaporized; the carbon is burned; and sodium chloride and ferric oxide form catalytic bed particles; this ferric chloride and oxygen react in reactor vessel 51 as well as in reactor sections 52, 53 and 54 to form chlorine and ferric oxide product.

The stream exiting from reactor vessels 51, 52, 53 and 54 enters cyclone separator 6 from line 21. The difference in elevation between the top of reactor vessel 51 and the inlet to cyclone separator 6 is approximately 70 feet (21.3 m). In cyclone separator 6, coarse iron oxide particles are separated from the stream and deposited via line 33 in hot-solids storage tank 7 from which they are recycled via line 30 to the bottom of the cylindrical section of reactor vessel 51. The gaseous stream and fine iron oxide particles exiting cycone separator 6 are transported via line 22 to cycone separator 8 which operates at a higher separation efficiency than cyclone separator 6, and removes most of the remaining solids from the gaseous product stream. This gaseous product stream is then fed via line 23 to the bottom of fluid-bed condenser 9. The condenser is provided with water-cooled internal coils 31 which reduce the temperature in the condenser to about 150° C. In condenser 9, unreacted gaseous iron chloride is condensed onto a bed of iron oxide particles, which were fed to condenser 9 from hot-solids storage tank 7 via line 29 through line 23. The unreacted ferric chloride and iron oxide particles are returned to the reactor via line 28 through line 1.

The cooled pressurized gaseous product leaving fluid bed condenser 9 is fed via line 24 to final cyclone separator 10 to remove any remaining entrained solids. The gaseous product is primarily chlorine which can be recycled directly to an ilmenite chlorination process or can be collected for other uses.

Part of the iron oxide product is obtained from line 27; the remainder from line 26. It is possible to operate with cyclone separator 8 removed from the system, in which case, iron oxide product could be removed from a tap in reactor recycle line 30.

The following startup procedure has been found satisfactory for the above-described system. The reactor system (51, 52, 53 and 54), the first cyclone separator (6), the hot solids storage tank (7), the iron-oxide recycle line (30) to the reactor and the interconnecting piping (21, 33) are heated to temperatures in the range of 350° to 500° C. with air, which is preheated to about 1000° C., and supplied to the equipment through the oxygen and feed materials inlet line (1). Iron oxide particles are fed to and circulated through the system during the initial heat-up to provide the inventory needed for the fluidized bed. When the temperature of the system has reached the 350°–500° C., range, the air is replaced with unheated oxygen and pulverized carbonaceous fuel is fed (from storage vessel 4) into the reactor system where it burns and further heats the equipment and iron oxide particles to the desired operating temperature range of 550° to 800° C. The sodium chloride is fed (from storage vessel 3) to the reactor system to combine with the recirculating iron oxide fluidized-bed particles to form the catalyst. The amount of sodium chloride fed is sufficient to provide a sodium chloride concentration in the range 0.1 to 10%, preferably 0.4 to 1.0%, by weight of the bed particles. At this point, the system is ready for establishing the desired steady-state operating conditions and material flows. The following ranges of operating conditions are suitable.

| Reactor temperature | 550–800° C. |
|---|---|
| Reactor inlet pressure | 50–150 psig (3–7 atm) |
| Ferric chloride feed | 3000–15,000 lb/hr (1360–6820 kg/hr) |
| Excess oxygen feed | 3–70% |
| Carbonaceous fuel feed | 150–400 lb/hr (68–180 kg/hr) |
| Sodium chloride feed | 50–300 lb/hr (23–136 kg/hr) |
| Iron oxide recycle to reactor | 15,000–60,000 lb/hr (6,800–27,200 kg/hr) |

For these conditions, the conversion of iron chlorides to iron oxide generally exceeds 90%. When the reactor outlet temperature is greater than 600° C., conversions of 95% or more are usually obtained.

The following Examples are presented to illustrate, but not to restrict, the present invention. Unless otherwise stated, all percentages are by weight. In the Examples and the Comparisons presented below, the equipment described above with reference to the drawing was employed, as were the above-described start-up and operating procedures. Note that although the invention is exemplified specifically with the recirculating-fluidized-bed-reactor system of the drawing, other reactors such as the one described in U.S. Pat. No. 3,793,444, can also function satisfactorily in the process of the present invention.

EXAMPLE I

The reactor system (51, 52, 53, 54), the first cyclone separator (6), the hot solids storage tank (7), the iron-oxide recycle line (30) to the reactor and the interconnecting piping (21, 33) were preheated to a temperature in the range of 600° to 700° C. Then, the conditions listed in Table I were established and the entire system was run continuously for 15 hours. The run was terminated when the iron chloride storage vessel (2) finally became empty because the feed rate to the reactor exceeded the capability of the equipment used for filling the iron chloride storage vessel.

During the 15-hour run the reactor exit temperature varied narrowly between 700° and 720° C., and the iron oxide recirculation rate was varied from 20,000 to 30,000 pounds per hour.

The dry, pulverized carbonaceous fuel employed in this run represented a preferred fuel for use in the process of this invention. The fuel was made from a lignite char, contained 0.7% hydrogen and had a stable ignition temperature of approximately 400° C.

During the 15-hour run, the conversion of iron chloride to iron oxide varied from 90% to above 95%; no undesirable temperature excursions were experienced; complete combustion of the fuel was achieved in a single pass through the reactor system; and the cooling surfaces of the fluid bed condenser remained substantially free of fouling.

EXAMPLE II

The operating conditions summarized in Table I were established after a preheating temperature in the range of 600° to 700° C. had been achieved. The dry, pulverized carbonaceous fuel used in this example was prepared from a lignite char and had a stable ignition temperature of 390° C. and a hydrogen content of 2.2%. The process was operated satisfactorily for seven hours during which no uncontrolled temperature excursions occurred, complete combustion of the fuel was achieved in a single pass through the reactor system, and only a slow build-up of low-melting-temperature ferric chloride hydrate was experienced on the cooling surfaces of the fluid bed condenser. This latter slow fouling of the condenser was the reason for terminating the run. A conversion of approximately 95% of the iron chloride to iron oxide was achieved during the run.

COMPARISONS

As in the preceding Examples, after preheating to a temperature in the range of 600° to 700° C., the conditions summarized in Table I for Comparison Runs A and B were established. The results of these runs, when compared with those of Examples I and II show the effects of the hydrogen content and the ignition temperature of the fuel upon the operation of the present process. In Comparison Run A, the dry pulverized fuel, which had been prepared from a lignite char, had a desirably low stable ignition temperaure of about 390° C., but contained an undesirably high amount of hydrogen of 3 ± ¼%. In Comparison Run B, although the fuel, which had been prepared from a bituminous char, had a very low hydrogen content of 0.3–0.4%, it also had an undesirably high ignition temperature of 570° C.

In contrast to Examples I and II, Comparison Run A, in which the hydrogen content of the fuel was 3%, had to be terminated after only 2½ hours of continuous operation because of excessive fouling of the fluid-bed-condenser cooling surfaces by ferric chloride hydrate. However, satisfactory temperature control, complete burning of the fuel in a single pass through the reactor system and approximately 95% conversion of iron chloride to iron oxide were achieved during the run.

Also in contrast to Examples I and II, Comparison Run B, in which the ignition temperature of the fuel was 570° C., had to be terminated after only three hours of continuous operation, because large lumps of sintered iron oxide, along with unburned fuel, had blocked the flow in the iron-oxide-recycle line (30). The presence of the unburned fuel in the recycle line indicated that all the fuel was not being burned in a single pass through the reactor. The presence of large lumps of sintered iron oxide indicated that temperature excursions to undesirably high temperatures had occurred. However, substantially no fouling of the fluid-bed-condenser cooling surfaces was encountered and at least a 95% conversion of iron chloride to iron oxide was achieved during the run.

As a result of these comparisons with Examples I and II, it was concluded that dry pulverized carbonaceous fuels having stable ignition temperatures of no greater than 500° C. and having hydrogen contents of between 0.5 and 2.5% are satisfactory for use in the process of the present invention.

TABLE I

| | Conversion of Iron Chlorides to Chlorine and Iron Oxide | | | |
|---|---|---|---|---|
| Operating Conditions | Example I | Example II | Comparison Run A | Comparison Run B |
| Reactor exit temperature[1], ° C. | 700–720 | 710–780 | 680–720 | 640–740 |
| Reactor inlet pressure, atm (gage) | 4.8 | 5.4 | 5.4 | 5.4 |
| Feed rates | | | | |
| Iron chloride, lbs/hr | 7750 | 3500–4000 | 5000–7000 | 3000–4000 |
| [kg/hr] | [3520] | [1590–1820] | [2270–3180] | [1360–1820] |
| Sodium chloride, lbs/hr | 50 | 50 | 90 | 300 |
| [kg/hr] | [23] | [23] | [41] | [136] |
| Fuel, lbs/hr | 250 | 200–250 | 200 | 150–200 |
| [kg/hr] | [114] | [91–114] | [91] | [68–91] |
| Oxygen, lbs/hr | 1900 | 1800 | 1600–1900 | 1600 |
| [kg/hr] | [860] | [820] | [730–860] | [730] |
| Nitrogen[2], lbs/hr | 0–500 | 1000 | 500–1000 | 1000 |
| [kg/hr] | (0–230] | [450] | [230–860] | [450] |
| % excess oxygen[3] | 23 | 69–101 | 15–71 | 71–310 |
| Iron oxide recirculation, lbs/hr | 20000–30000 | 16000 | 22000 | 22000 |
| [kg/hr] | [9060–13640] | [7270] | [10000] | [10000] |
| Fuel | | | | |
| % hydrogen content[4] | 0.7 | 2.2 | 3 | 0.3–0.4 |
| Stable ignition temperature, ° C. | 400 | 390 | 390 | 570 |
| % Conversion of iron chloride to iron oxide | 98 | 95 | 95 | 95 |
| Duration of run, hours | 15 | 7 | 2.5 | 3 |

Notes:
[1]Temperature measured immediately upstream of the first cyclone separator.
[2]Nitrogen enters along with feed materials from storage vessels which are pressurized with nitrogen.
[3]% excess over the stoichiometric amount required to convert all iron chloride to chlorine and iron oxide, all carbon to carbon dioxide, and all hydrogen to water.
[4]The hydrogen in the fuel is derived from residual hydrocarbons. The fixed carbon content of the fuel is 70% by weight; the remainder being primarily ash.

What is claimed is:

1. In a process for producing chlorine and iron oxide in a fluidized-bed reactor by treating ferric chloride in the vapor phase with an excess of oxygen at a temperature of 550° to 800° C. in the presence of a catalyst made from sodium chloride and iron oxide, wherein a carbonaceous fuel is fed to the reactor bed to supply supplemental heat, the improvement comprising continuously recirculating a portion of the bed material from the reactor back to the reactor and supplying the fuel as a dry, pulverized solid in an amount equal to between 1 and 9 percent of the weight of the iron chloride fed to the reactor, the fuel having a stable ignition temperature in air of no greater than 500° C. and containing between 0.5 and 2.5 percent of hydrogen based on the weight of the fuel.

2. The process of claim 1 wherein the oxygen is fed in an amount that is equivalent to between 103 and 107 percent of the stoichiometric amount required to convert all the iron chloride to ferric oxide and all the carbon and hydrogen in the fuel to carbon dioxide and water, respectively, the fuel is fed in an amount that is equivalent to between 3 and 7 percent of the weight of the iron chloride fed, and the fuel has a stable ignition temperature of between 350° and 450° C. and contains between 0.6 and 1.5 weight percent hydrogen, and the recirculation rate of bed material is between 1 and 10 times the rate or iron chloride feed.

3. The process of claim 2 wherein the bed-material recirculation rate is between 2 and 6 times the weight rate of iron chloride feed.

4. The process of claim 1 wherein the iron chloride feed is supplied as by-product of an ilmenite chlorination process.

* * * * *

UNITED STATES PATENT OFFICE
CERTIFICATE OF CORRECTION

PATENT NO. : 4,144,316
DATED : MARCH 13, 1979
INVENTOR(S) : DAVID J. HAACK & JAMES W. REEVES

It is certified that error appears in the above-identified patent and that said Letters Patent are hereby corrected as shown below:

Column 10, line 4, Claim 2, "107" should be -- 170 --.

Signed and Sealed this

Twenty-fifth Day of September 1979

[SEAL]

Attest:

LUTRELLE F. PARKER

Attesting Officer   Acting Commissioner of Patents and Trademarks